United States Patent
Nishibori et al.

(10) Patent No.: US 7,227,897 B2
(45) Date of Patent: Jun. 5, 2007

(54) MOTION VECTOR DETECTOR AND MOTION VECTOR DETECTING METHOD

(75) Inventors: Kazuhiko Nishibori, Kanagawa (JP); Koji Aoyama, Saitama (JP); Makoto Kondo, Kanagawa (JP); Takaya Hoshino, Saitama (JP); Yukihiko Mogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 10/405,138

(22) Filed: Apr. 2, 2003

(65) Prior Publication Data

US 2003/0227973 A1 Dec. 11, 2003

(30) Foreign Application Priority Data

Apr. 3, 2002 (JP) ............................. 2002-101766

(51) Int. Cl.
*H04N 7/12* (2006.01)
*G06K 9/36* (2006.01)

(52) U.S. Cl. ................... 375/240.16; 382/236
(58) Field of Classification Search ........... 375/240.16, 375/240.27; 382/236, 252
See application file for complete search history.

(56) References Cited

U.S. PATENT DOCUMENTS

| | | | |
|---|---|---|---|
| 6,343,099 B1 * | 1/2002 | Ogura | 375/240.16 |
| 6,456,660 B1 * | 9/2002 | Yokoyama | 375/240.16 |
| 6,567,469 B1 * | 5/2003 | Rackett | 375/240.16 |
| 6,591,015 B1 * | 7/2003 | Yasunari et al. | 382/236 |
| 7,075,989 B2 * | 7/2006 | Murakami et al. | 375/240.16 |

FOREIGN PATENT DOCUMENTS

| | | |
|---|---|---|
| EP | 0 639 926 | 2/1995 |
| JP | 8 98181 | 4/1996 |

* cited by examiner

*Primary Examiner*—Gims Philippe
(74) *Attorney, Agent, or Firm*—Frommer Lawrence & Haug LLP; William S. Frommer; Thomas F. Presson

(57) ABSTRACT

A vector motion detector is provided which corrects the quantity of a motion vector determined with the block matching technique between a reference block taking a reference pixel extracted from a current frame as its origin and a search block extracted from a reference frame and moving within or along the circumference of a search range and which is outside the search range. The vector motion detector makes the motion vector quantity correction so that the motion vector will fall within the search rang. Thus, it can provide a smooth motion of even an image that moves fast.

18 Claims, 11 Drawing Sheets

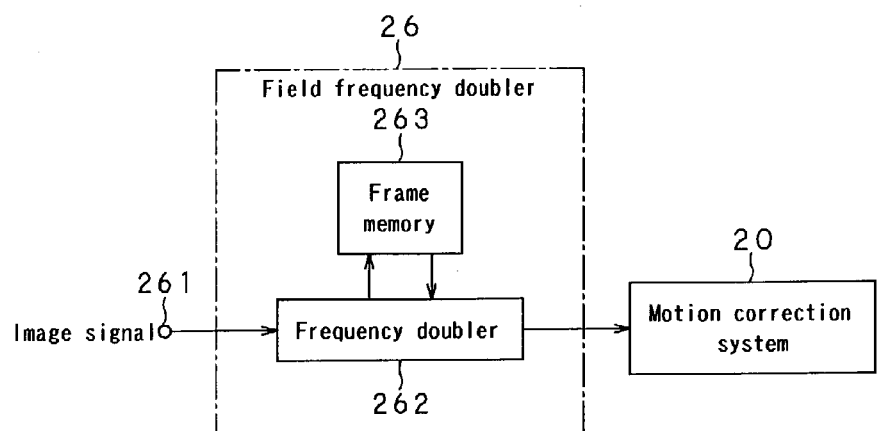
FIG.11
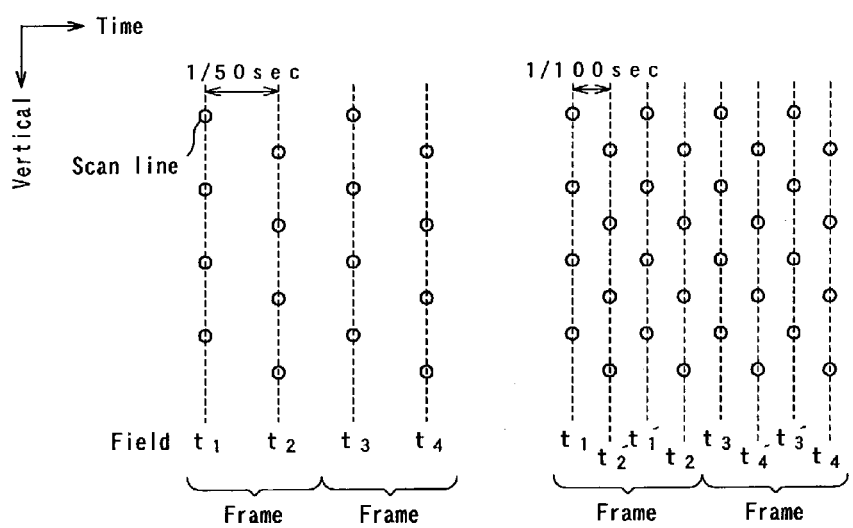
FIG.12A  FIG.12B

MOTION VECTOR DETECTOR AND MOTION VECTOR DETECTING METHOD

BACKGROUND OF THE INVENTION

1. Field of the Invention

The present invention generally relates to a motion vector detector and a motion vector detecting method, and more particularly to a motion vector detector and a motion vector detecting method capable of correcting a motion vector matching its original motion in the block matching technique.

This application claims the priority of the Japanese Patent Application No. 2002-101766 filed on Apr. 3, 2002, the entirety of which is incorporated by reference herein.

2. Description of the Related Art

Heretofore, the TV broadcasting systems have adopted most widely the interlaced scanning or interlacing in which the electron beam is scanned across the screen once every other horizontal scan line. In the interlacing, input image signal to the TV receiver is subjected to field interpolation to produce an interlaced image of a double field frequency to suppress flickering of the entire screen. Also, in the interfacing, the interpolated fields are subjected to motion compensation to prevent letters from appearing skewered, a motion from appearing discontinuous, etc.

For the above motion compensation, a difference between a current frame of the input image signal and a reference frame derived from one-frame delay of the current frame is calculated and a motion vector is detected on the basis of the calculated difference. Then, in a motion-correction field positioned intermediate between the current and reference frames, pixels are shifted on the basis of the detected motion vector. Note that for the detection of a motion vector, the block matching technique is widely used as a prevailing technique in this field of art.

With the block matching technique, a current frame 80 is broken into a plurality of reference blocks 101, and a block having a closest correlation with the reference blocks in the current frame 80 is detected from a search block 103 which moves within a search range 104 of a reference frame 90, as shown in FIG. 1. Then, a deviation in position between the detected search block 103 and reference block 101 (direction and magnitude of the motion) is taken as a motion vector.

For the determination of the above correlation, a difference is calculated between each of pixels in the search block 103 and corresponding ones in the reference block 101 to determine an assessed value given by the difference, say, a sum of absolute values of differences (will be referred to as "difference absolute-value sum" hereunder wherever appropriate), for example. Next, the above operations are repeated for all the search blocks 103 to determine a smallest one of the determined assessed-value sums, namely, difference absolute-value sums. The search block 103 from which the smallest difference absolute-value sum is derived is taken as a block having the closest correlation with the reference block 101, and a vector identifiable between a pixel 113 at the origin of such a block and a one at the origin of the reference block 101 is taken as motion vector.

Next, a magnitude and direction of shifting the pixel are determined on the basis of the quantity and direction of the motion vector determined as above. Then, in a motion correction field 100 being intermediate between the current and reference frames 80 and 90, the pixel is shifted correspondingly to a shift magnitude determined based on the position of the pixel at the origin of the reference block (or the pixel is shifted in the determined direction by the magnitude of shifting of the pixel 113 from the origin). It is assumed here that the shift magnitude is a half of the quantity of the vector motion. In the motion correction field 100, the pixel will be shifted to an intermediate position between the pixel position in the current frame 80 and that in the reference frame 90. Namely, since such a motion correction field can be inserted that will smoothen the motion of the pixel continuous from the current frame 80 to the reference frame 90, so it is possible to produce an interlaced image free from display quality degradation.

It is important to note that the magnitude of a motion vector detectable with the block matching technique, that is, the range of pixel position from which a difference absolute-value sum can be derived, depends upon the sizes of the reference block 101 and search range 104. Therefore, for appropriate compensation of all image motions, the search range 104 should desirably be as large in size as possible, but the size is normally limited to a predetermined one because of the circuit scale and calculation time which should be as small and short as possible.

With the aforementioned conventional block matching technique, however, even when a real motion vector 111 to be determined possibly exists outside the search range 104, an irregular motion vector 112 different from its original motion will be determined since top priority is given to the sum of differences between the blocks 101 and 103 within the search range 104 as shown in FIG. 2. If a shift magnitude is determined directly based on the irregular motion vector 112, there will be caused an image quality degradation and failure in processing of each area.

OBJECT AND SUMMARY OF THE INVENTION

It is therefore an object of the present invention to overcome the above-mentioned drawbacks of the related art by providing a motion vector detector and a motion vector detecting method capable of preventing degradation of a converted image by correcting an out-range motion vector determined with the block matching technique so that it will match a real image motion.

The above object can be attained by providing a motion vector detector for detecting a motion vector of a reference pixel in a current input frame with the block matching technique, the detector including according to the present invention: a vector calculating means for sequentially calculating a sum of absolute values of differences in pixel between a reference block taking as its origin a reference pixel extracted from a current frame and a search block moving within or along the circumference of a search range extracted from a reference frame one frame after the current frame to determine the vector of a motion between a pixel position within the search block in which the difference absolute-value sum is smallest and the position of the reference pixel; and a vector correcting means for correcting the quantity of the motion vector determined by the vector calculating means so that it will fall within the search range when the pixel position for the smallest difference absolute-value sum exists outside the search range.

Also the above object can be attained by providing a motion vector detecting method of detecting a motion vector of a reference pixel in a current input frame with the block matching technique, the method including, according to the present invention steps of: sequentially calculating a sum of absolute values of differences in pixel between a reference block taking as its origin a reference pixel extracted from a current frame and a search block moving within or along the circumference of a search range extracted from a reference frame one frame after the current frame to determine the vector of a motion between a pixel position within the search block in which the difference absolute-value sum is smallest and the position of the reference pixel; and correcting the quantity of the motion vector determined in the difference absolute-value sum calculating step so that it will fall within the search range when the pixel position for the smallest difference absolute-value sum exists outside the search range.

In the above motion vector detector and a motion vector detecting method, when the motion vector determined by the block matching technique between the reference block taking as its origin the reference pixel extracted from the current frame and the search block moving within or along the circumference of the search range extracted from the reference frame exists outside the search range, the quantity of the motion vector is corrected so as to fall within the search range.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 11 shows an example connection of a field frequency doubler circuit to the motion correction system;

FIGS. 12A and 12B show interlaced image signals before and after being subjected to frequency doubling;

DETAILED DESCRIPTION OF THE PREFERRED EMBODIMENTS

The embodiment of the present invention will be described herebelow with reference to the accompanying drawings.

The motion vector detector according to the present invention is generally indicated with a reference 1. The motion vector detector 1 is integrally built in a motion correction system 20 used in a TV receiver of, for example, the PAL (phase alternation by line) type.

Figure 1:
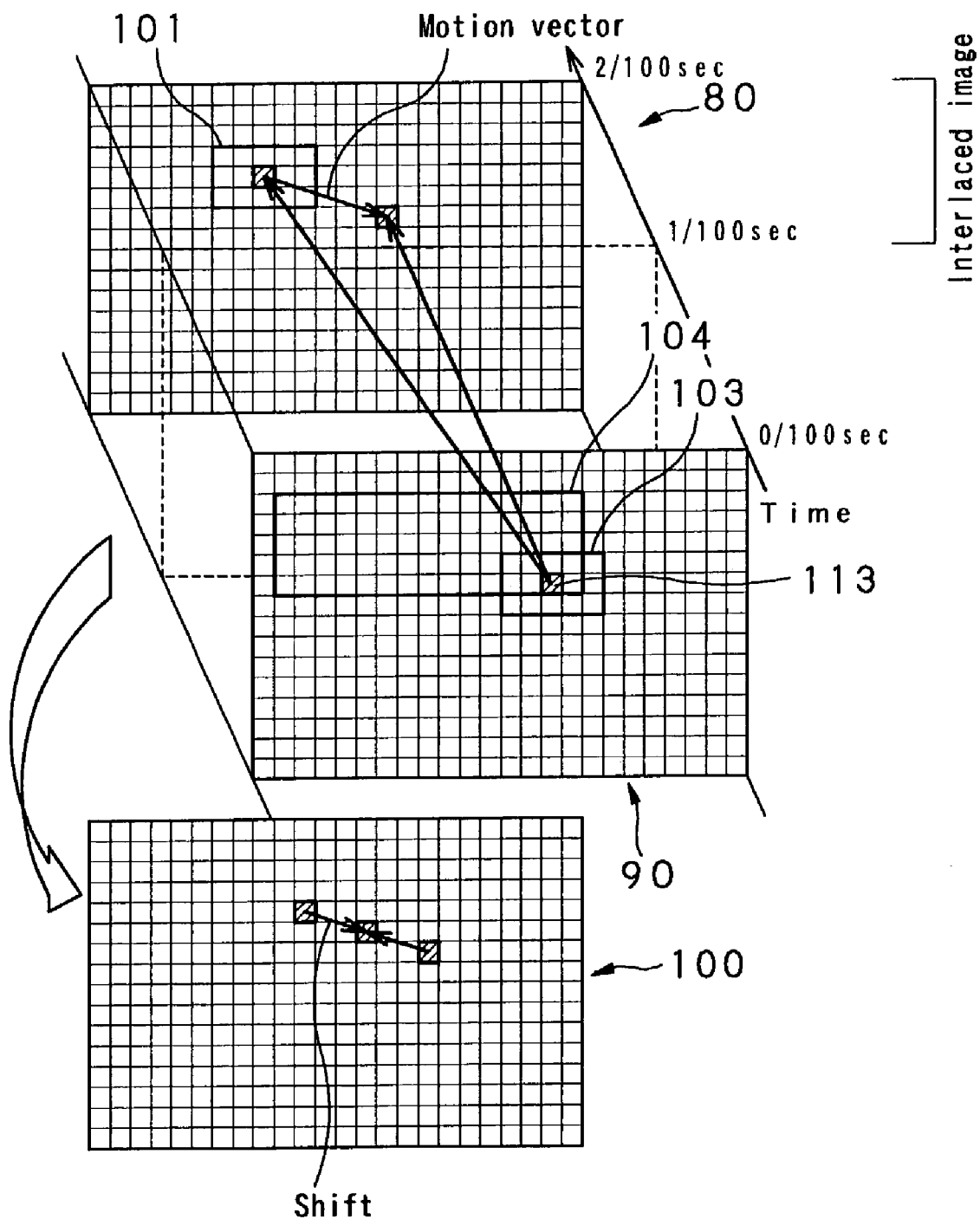
FIG. 1 explains the conventional block matching technique.
Figure 2:
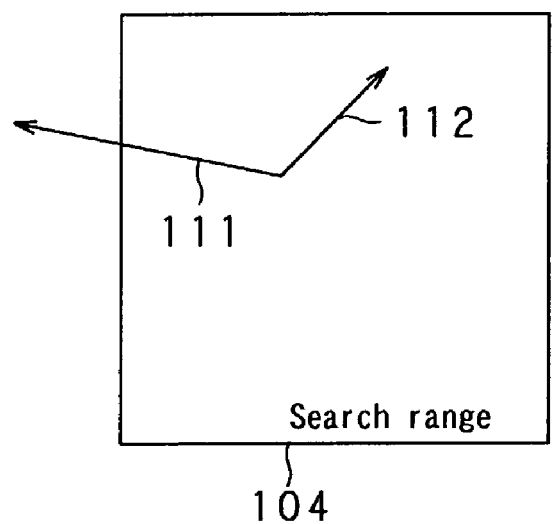
FIG. 2 explains problems of the conventional block matching technique.
Figure 3:
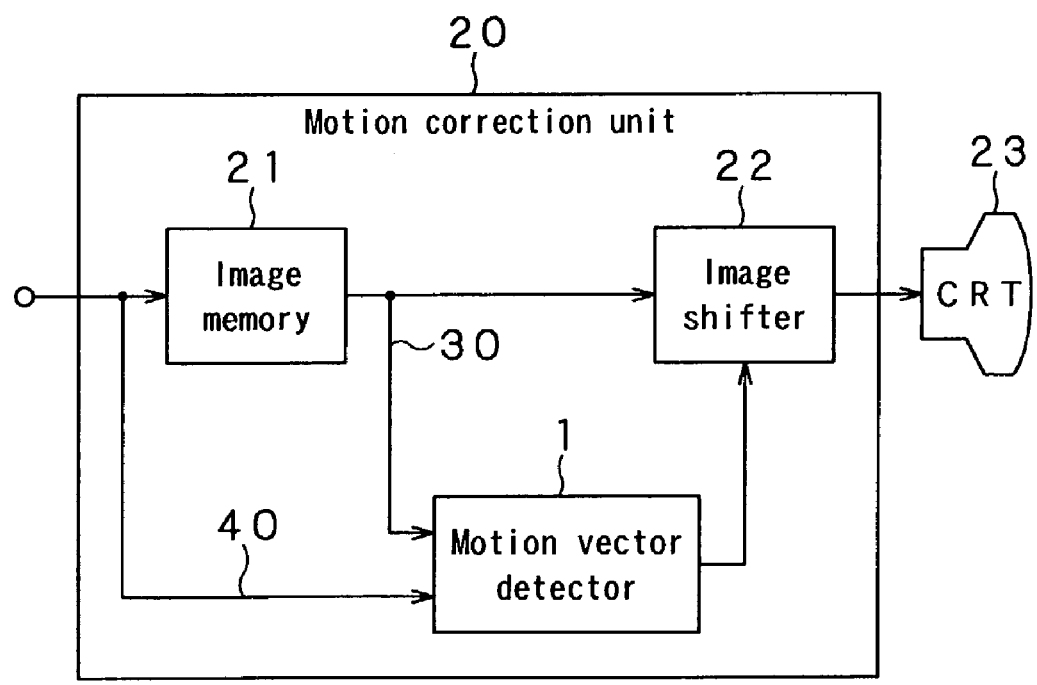
FIG. 3 is a schematic block diagram of a motion correction system.

Referring now to FIG. 3, there is schematically illustrated in the form of a block diagram the motion correction system 20. As shown, the motion correction system 20 includes an image memory 21, image shifter 22 and the motion vector detector 1 according to the present invention.

The above image memory 21 stores sequentially supplied interlaced image signals in fields for one frame. In the following explanation, an image signal output from the image memory 21 will be referred to as "current frame" 30 hereunder, and an image signal input to the image memory 21 will be referred to as "reference frame" 40 hereunder. That is to say, the reference frame 40 supplied from the image memory 21 has a one-frame delay in relation to the current frame 30 provided by the image memory 21.

The motion vector detector 1 detects a motion vector based on the supplied current frame 30 and reference frame 40, and supplies the image shifter 22 with the detected motion vector, namely, information on a magnitude and direction of the shift that arc based on the motion vector. The function: and composition of the motion vector detector 1 will be described in detail later.

The image shifter 22 receives, for each pixel, a motion vector detected by the motion vector detector I or information such as magnitude of the shift and the like that are based on the motion vector. Also, the image shifter 22 shifts each pixel position in the current frame supplied from the image memory 21 in the vector or shift direction within the range of the quality of the received motion vector or within the range of the received shift magnitude. The image shifter 22 supplies the image signal whose pixel position has been shifted in fields to a CRT (cathode ray tube) 23 which will display the image signal supplied from the image shifter 22 on the screen thereof.

Figure 4:
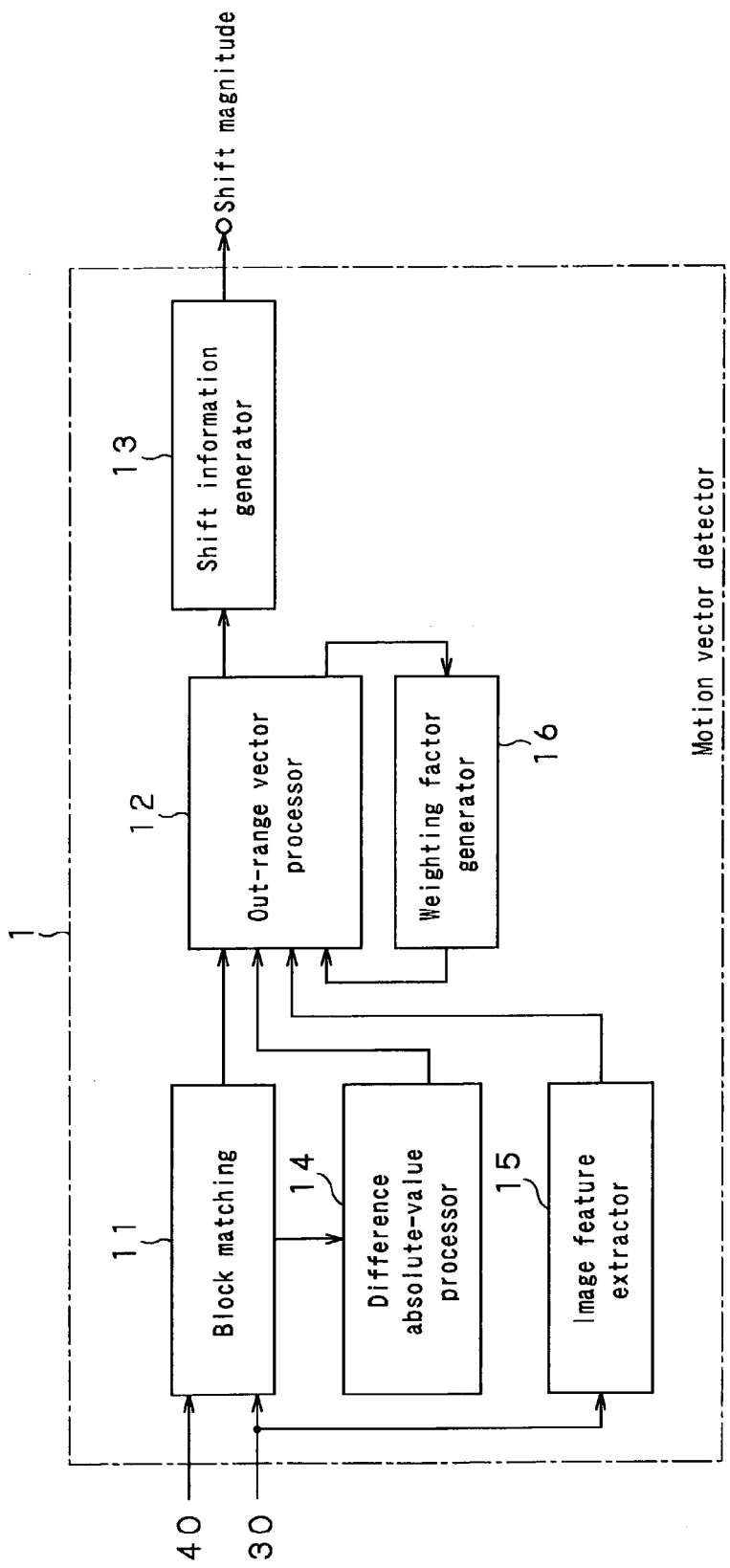
FIG. 4 shows an example of the internal construction of the motion vector detector according to the present invention.

The motion vector detector 1 according to the present invention is constructed as will be described below:

As shown in FIG. 4, the motion vector detector 1 includes a block matching calculator 11, out-range vector processor 12, shift information generator 13, difference absolute-value processor 14, image feature extractor 15 and a weight factor generator 16.

Figure 5:
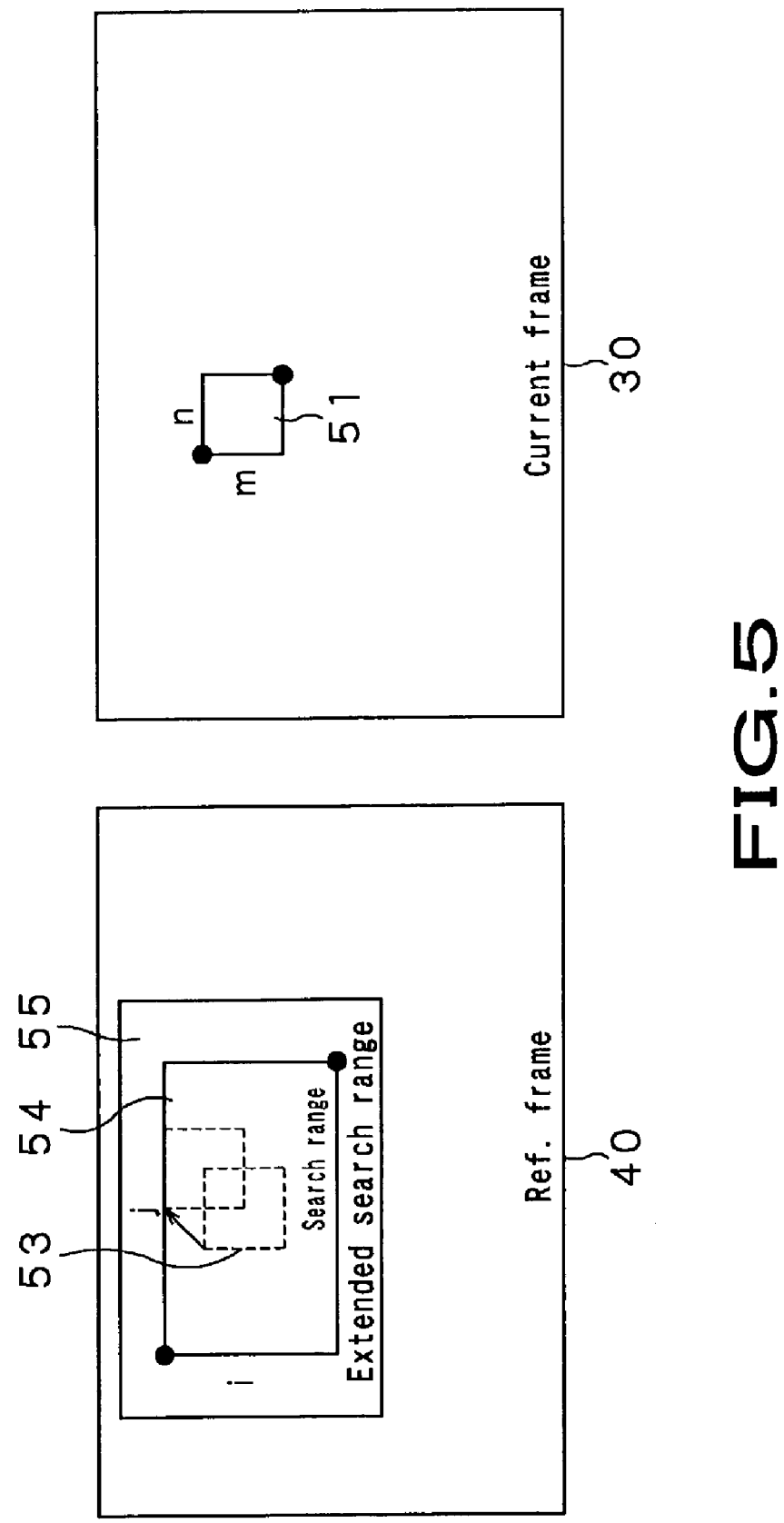
FIG. 5 explains the ranges of search and extended search.

The block matching calculator 11 detects a motion vector by the block matching technique on the basis of the supplied current frame 30 and reference frame 40 as shown in FIG. 5. The block matching calculator 11 also detects a block given by an m×n pixel size and having a closest correlation with the reference block 51 in the current frame 30 from a search block 53 moving within a search range 54 in the reference frame 40. A deviation in position between the detected search block 53 and reference block 51 (direction and magnitude of the motion) is taken as a motion vector. It should be noted that the pixel size of this search range 54 is given by i×j.

The block matching calculator 11 moves the search block 53 to an extended search range 55 resulted from extension of the above search range 54. Since the pixel range from which a difference absolute-value sum can be determined can be made larger than in the conventional block matching, the block matching calculator 11 can work satisfactorily even when a real motion vector to be determined possibly exists outside the search range 54.

Note that to determine the above correlation, the block matching calculator 11 calculates a difference of each pixel value in the search block 53 from a pixel value corresponding to the reference block 51 to determine an assessed value indicated by the difference, for example, a difference absolute-value sum. Next, the block matching calculator 11 repeats the above determination with all the search blocks 53 and determines a smallest one of the assessed-value sums. Next, the block matching calculator 11 repeats the above operations for all the search blocks 53 to determine a smallest one of the assessed-value sums, that is, difference absolute-value sums. Further, the block matching calculator 11 takes a search block 53 that provides the smallest difference absolute-value sum as having the closest correlation with the reference block 51, and also takes, as a motion vector, a vector identifiable between a pixel at the origin of such a block and a one at the origin of the reference block 51. The block matching calculator 11 sends the detected motion vector to the out-range vector processor 12.

Figure 6:
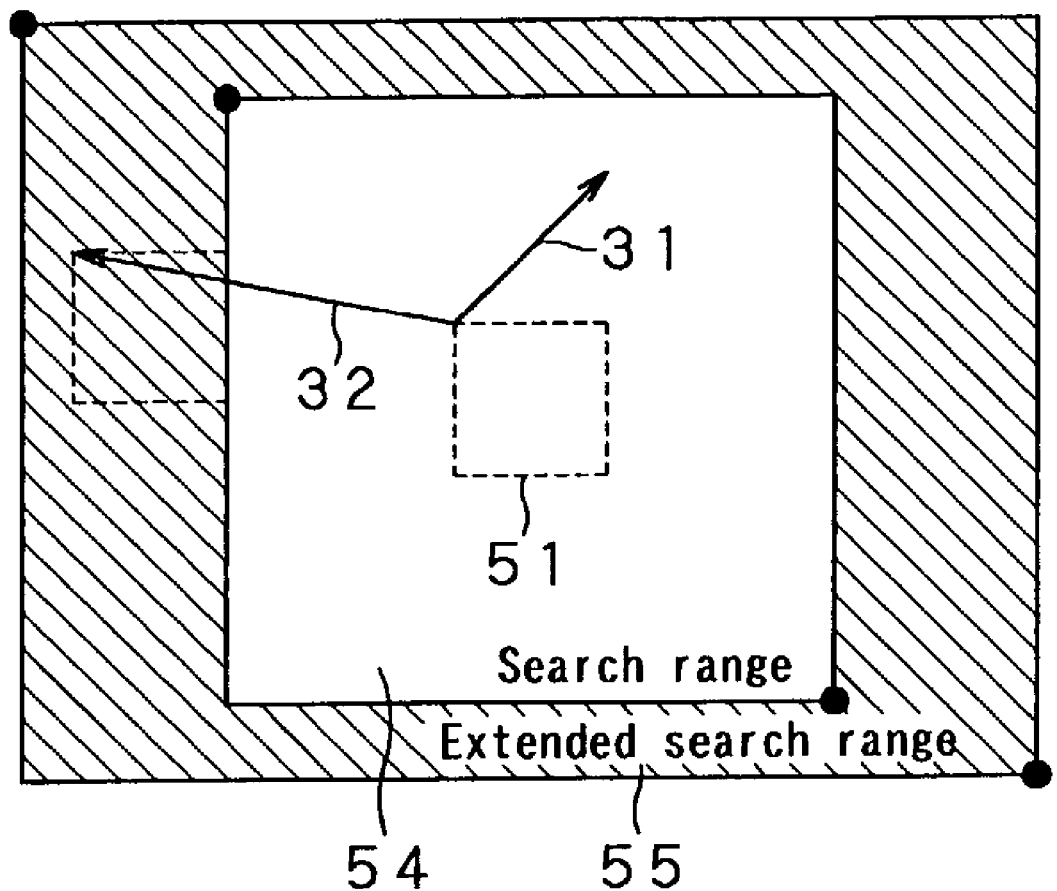
FIG. 6 explains a detected motion vector being outside the search range.

Making reference to flags sent from the difference absolute-value processor 14 and image feature extractor 15, the out-range vector processor 12 corrects the motion vector sent from the block matching calculator 11. When the supplied motion vector is a motion vector 31 which falls within the search range 54 as shown in FIG. 6 for example or when it has been determined based on the flags sent from the difference absolute-value processor 14 and image feature extractor 15 that no correction is required, the out-range vector processor 12 does not make any special correction of the supplied motion vector but sends the motion vector as it is to the shift information generator 13. On the contrary, when the supplied motion vector is outside the search range 54 as shown in FIG. 6 for example, in other words, when the smallest difference absolute-value sum is within the extended search range 55, the out-range vector processor 12 will correct the supplied motion vector as will be described in detail later.

Based on the motion vector sent from the out-range vector processor 12, the shift information generator 13 generates shift information based on which a pixel is shifted. It should be noted that the shift information allows to make an image shifting direction coincide with the direction of the motion vector or shift a pixel by a half of the quantity of the motion vector.

Based on the motion vector and difference absolute-value sum determined by the block matching calculator 11, the difference absolute-value processor 14 calculates a difference absolute-value sum flag and sends it to the out-range vector processor 12.

The image feature extractor 15 extracts a feature such as a flat part, edge part or the like from image signals of sequentially supplied current frames to generate a feature flag. The image feature extractor 15 sends the feature flag thus generated to the out-range vector processor 12.

The weight factor generator 16 extracts the polarities of horizontal components of the motion vector of one of the pixels on a horizontal line one pixel above the pixel at the origin of the reference block 51, of which the motion vector is outside the search range 54. Then, the weight factor generator 16 examines all the pixels whose motion vectors are outside the search range 54 for the tendency of the polarities of the extracted horizontal components. Further, the weight factor generator 16 sends a weight factor matching the polarity tendency to the out-range vector processor 12.

Figure 7:
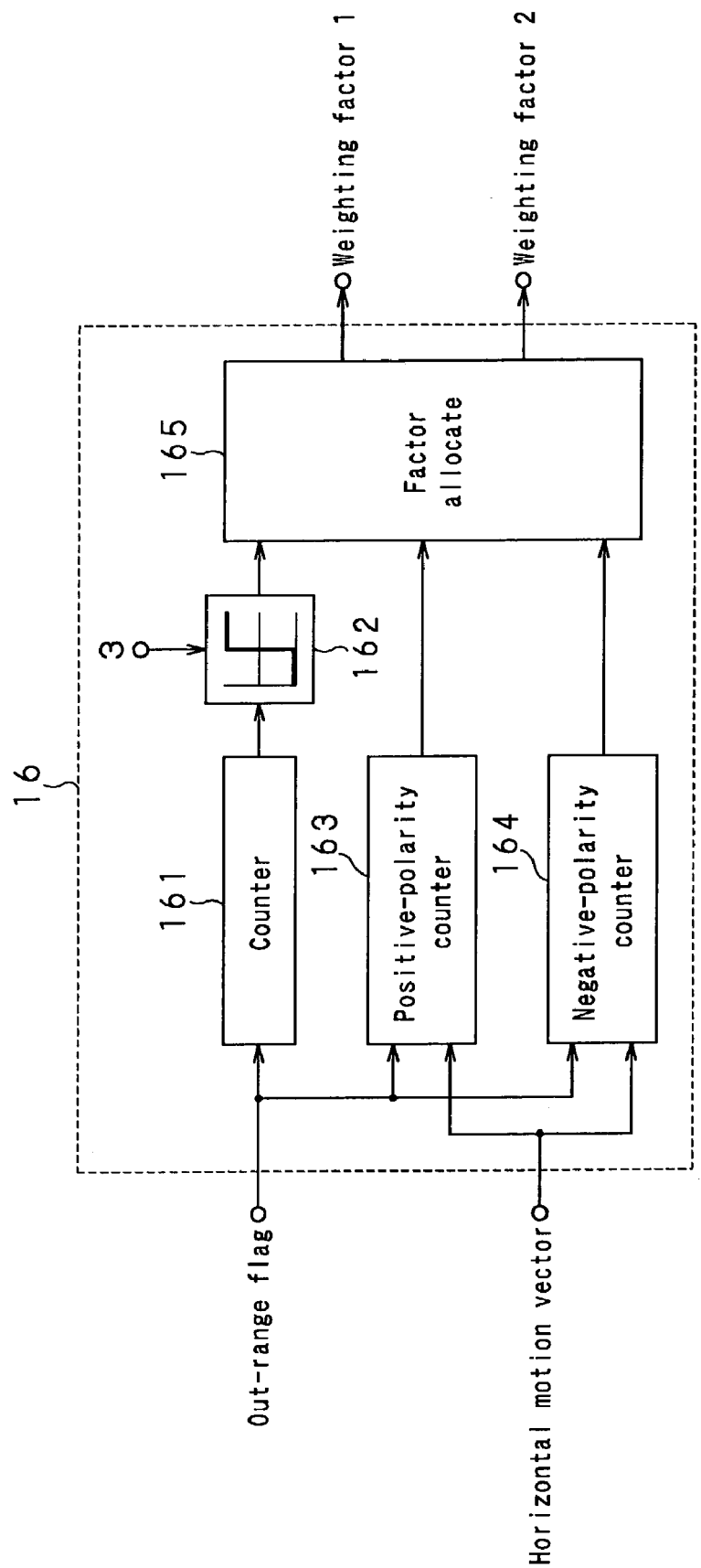
FIG. 7 explains an construction of a weighting factor generator.

The weight factor generator 16 may be constructed as shown in FIG. 7.

As shown in FIG. 7, the weight factor generator 16 includes a counter 161, binarizing processor 162, positive-polarity counter 163, negative-polarity counter 164 and a factor allocator 165.

The weight factor generator 16 is sequentially supplied with an out-range flag for each pixel in a horizontal line one pixel above the position of the reference pixel in the reference block 51 and polarity of the motion vector. The out-range flag indicates that a motion vector is "valid" when it is outside the search range 54. That is, since each frame is sequentially motion-corrected starting with pixels in the upper portion of the screen, the motion vector detector 1 can detect the tendency of the motion vectors (real image motion) of the pixels in a one-pixel-higher horizontal line.

The counter 161 is supplied with out-range flags from the out-range vector processor 12. It counts a number of "valid" ones of the out-range flags and supplies it to the binarizing processor 162. The binarizing processor 162 binarizes the output from the counter 161 with the use of a threshold, and supplies a weight select signal to the factor allocator 165.

The positive-polarity counter 163 is supplied with the out-range flag and polarities of the horizontal components of a motion vector. When the out-range flag is "valid", the positive-polarity counter 163 counts positive polarities of the horizontal components and sends the counted number of positive polarities to the factor allocator 165.

The negative-polarity counter 164 is supplied with the out-range flag and polarities of the horizontal components of a motion vector. When the out-range flag is "valid", the negative-polarity counter 164 counts negative polarities of the horizontal components and sends the counted number of negative polarities to the factor allocator 165.

Based on the weight select signal supplied from the binarizing processing 162, counted number of positive polarities of the horizontal components supplied from the positive-polarity counter 163 and counted number of negative polarities of the horizontal components supplied from the negative-polarity counter 164, the factor allocator 165 generates weight factors A and B and supplies them to the out-range vector processor 12. That it, based on the number of "valid" out-range flags, the factor allocator 165 determines a number of ones of the pixels in the one-pixel-higher horizontal line, whose motion vector is outside the search range 54. A number of such pixels, exceeding a predetermined one, means the quantity of the motion vector of the pixels around the reference pixel is large, and only in this case, the factor allocator 165 determines the tendency of the polarities of the horizontal components of the motion vector. Comparing the output (number of positive polarities of the horizontal components of the motion vector) from the positive-polarity counter 163 with the output (number of negative polarities of the horizontal components of the motion vector) from the negative-polarity counter 164, the factor allocator 165 generates the weight factors A and B so that the larger counter output is weighted. Of the weight factors A and B matching the tendency of polarities, the one for the larger counter output may be taken as "1" while the other may be taken as "0". The weight factors A and B may be updated, and the counters 163 and 164 may be reset, at any time such as at a horizontal sync, vertical sync or the like.

Note that supplied with the weight factors A and B, the out-range vector processor 12 may correct the motion vector of the corrected reference pixel so that it will reflect the tendency of the motion vectors of the surrounding pixels. Thus, it is possible to prevent variation of the vector from one block to another.

Figure 8A:
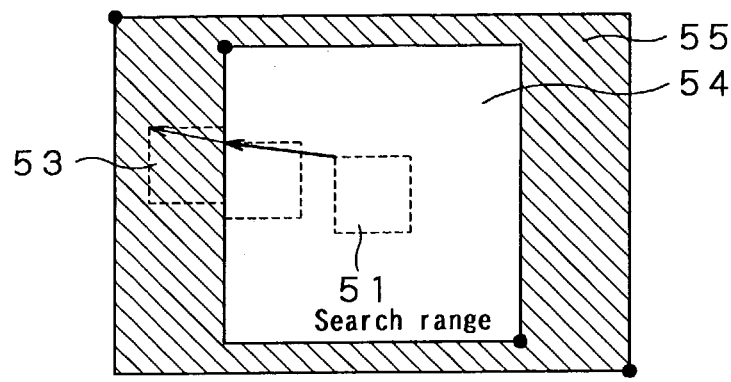
FIGS. 8A to 8C explain the correction in a out-range vector processor 12.

The motion vector detector 1 constructed as above according to the present invention functions as will be described below:

First, the function of the out-range vector processor 12 will be described. When the motion vector sent to the out-range vector processor 12 is outside the search range 54 show in FIG. 6 for example, it is corrected as will be described below:

The first correction is such that as shown in FIG. 8A for example, the direction of a motion vector to correct is made to match the motion vector direction determined by the block matching calculator 11. More specifically, only the vector quantity is reduced to the contour of the search range 54 without changing the motor vector direction determined by the block matching calculator 11.

Figure 8B:
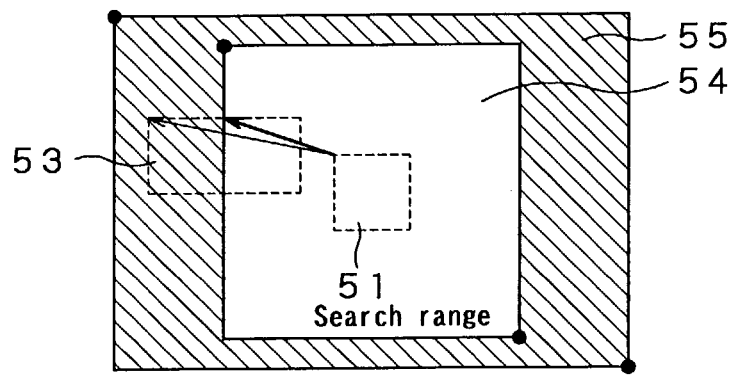

The second correction is such that as shown in FIG. 8B for example, the vertical components of a motion vector under correction are made o match those of a motion vector determined by the block matching calculator 11 or horizontal components of a motion vector under correction are made to match those of the motion vector determined by the block matching calculator 11, while the vector quantity is reduced to the contour of the search range 54.

Figure 8C:
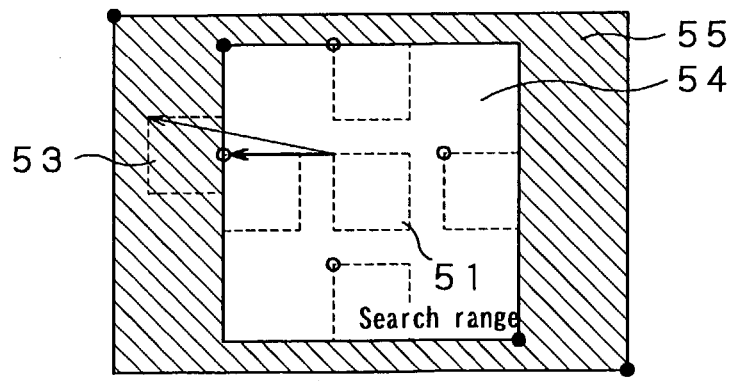

The third correction is such that as shown in FIG. 8C for example, there is preset a plurality of possible motion vectors whose quantity falls within the search range 54 and one of the possible motion vectors is selected correspondingly to the motion vector direction and quantity determined by the block matching calculator 11 (in other words, correspondingly to a pixel position where the difference absolute-value sum is smallest). It should be noted that as a possible motion vector, one motion vector may be set at each side of the search range 54 as shown in FIG. 8C.

As will be seen from the foregoing, the motor vector detector 1 according to the present invention can easily detect a real motion vector without any top priority given to the smallest one of the difference absolute-value sums of the blocks 51 and 53 as in the conventional block matching even in case the real motion vector being sought exists outside the search range 54. Thus, the motion vector detector according to the present invention will not detect any irregular motion vectors different from their original motions and thus permits to prevent any image quality degradation and failure in processing of each area.

Also, since the determined motion vector outside the search range 54 is contracted to inside the search range 54, the motion vector detector according to the present invention can correct the motion vector to be smooth even in case the image motion is slow.

Figure 9:
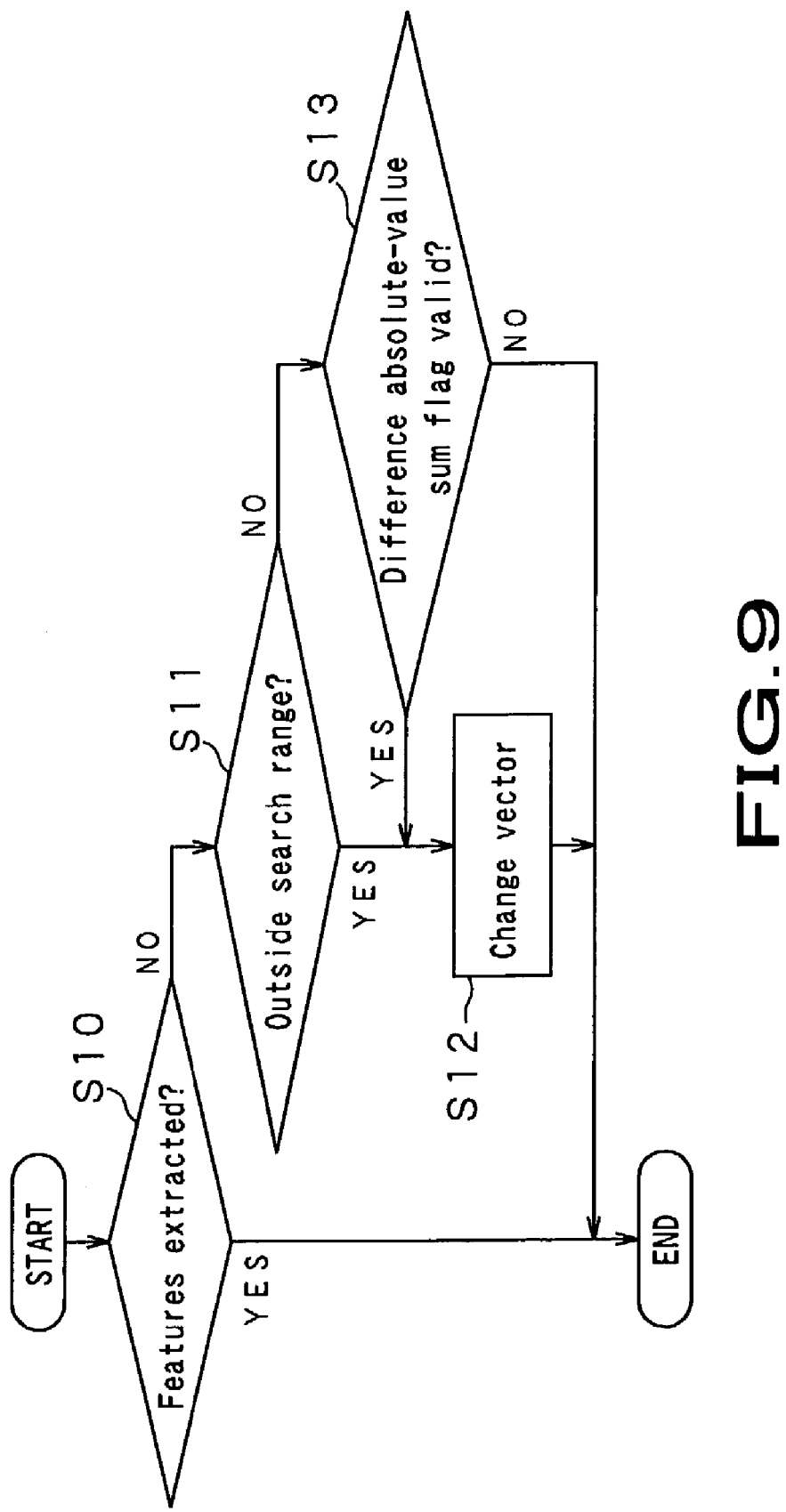
FIG. 9 shows a flow of operations for determination of a motion vector based on a difference absolute-value sum flag and a feature flag.

The motion vector detector 1 according to the present invention correct a motion vector on the basis of the difference absolute-value sum flag and feature flag as will be explained below with reference to FIG. 9:

First in step S10, the image feature extractor 15 determines based on the feature flag whether image signals of sequentially supplied current frames include any feature such as a flat part, edge part or the like. When a feature can be extracted based on the feature flag, the operation is completed since it suffices to match the motion vector with the feature. If no feature can be extracted, it is suggested that the image is free of flat or edge part and thus the motion vector detector 1 goes to step S11.

In step S11, the difference absolute-value processor 14 determines whether the motion vector supplied from the block matching calculator 11 is outside the search range 54. When the motion vector is outside the search range 54, the motion vector detector 1 hoes to step S12. On the contrary, when the motion vector is within the search range 54, the motion vector detector 1 will go to step S13.

In step S12, the out-range vector processor 12 corrects the motion vector determined as above.

In step S13, the difference absolute-value processor 14 calculates a difference absolute-value sum flag through comparison of the difference absolute-value sum determined by the block matching calculator 11 with a preset threshold or through any other operation. When the difference absolute-value sum flag is valid, the motion vector detector 1 goes to step S12 where the determined motion vector will be corrected like a motion vector existing outside the search range 54. On the contrary, when the difference absolute-value sum flag is not valid, the operation is complete without any correction.

More particularly, in step S13, when the determined motion vector is within the search range 54, there is calculated a difference absolute-value sum flag corresponding to a distribution tendency of difference absolute-value sums in the search range 54. Thus, even in case a determined motion vector is outside the search range 54 because of a fast image motion, identification of the distribution tendency of difference absolute-value sums will prevent any motion vector from being determined erroneously based on pixels inside the search range 54.

Figure 10:
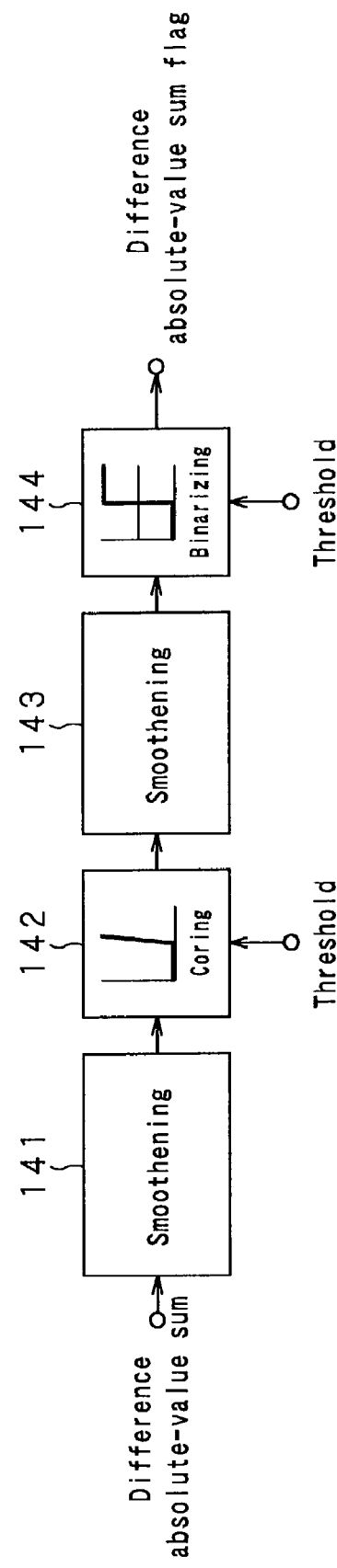
FIG. 10 shows a data flow in step S13 in a difference absolute-value processor.

The data flow in the difference absolute-value processor 14 in step S13 is shown in FIG. 10.

The difference absolute-value sum supplied to the difference absolute-value processor 14 is smoothened by a low-pass filter 141 to have an isolated maximum point and random components thereof removed. Next, the difference absolute-value sum is cored based on a threshold by a coring processor 142, and then smoothened by a second low-pass filter 143. Next, the difference absolute-value sum is binarized based on a predetermined threshold by a binarizing calculator 144 to provide a difference absolute value sum flag.

Note that the out-range vector processor 12 can refer to the aforementioned weight factors A and B in correcting the motion vector on the basis of the feature flag and difference absolute-value sum flag generated as above. Thus, the out-range processor 12 can correct a determined motion vector so that it vector will reflect the motion vector tendency of the surrounding pixels even in case the motion vector is outside the search range 54 because the image moves fast. Thus, image quality can be prevented from being further degraded.

As having been described in detail in the foregoing, when a motion vector, determined with the block matching technique between a reference block taking a reference pixel extracted from a current frame as its origin and a search block extracted from a reference frame and moving within or along the circumference of a search range, is outside the search range, the motion vector detector 1 according to the present invention corrects the quantity of the motion vector so that it will fall within the search range.

Therefore, even when the motion vector determined with the block matching technique exists outside the search range, the motion vector detector 1 according to the present invention can correct the motion vector so that it will match a real image motion. So, the motion vector detector 1 can prevent any image quality degradation and failure in processing of each area.

Note that the present invention is not limited to the aforementioned embodiment. For example, the interlaced image signal supplied to the aforementioned motion correction system 20 may be a signal converted by the field frequency doubler circuit 26 to have a double field frequency. The field frequency doubler circuit 26 is provided to prevent the screen flickering by improving the resolution. For example, in the PAL system, the field frequency doubler circuit 26 converts an image signal whose field frequency is 50 Hz into an image signal whose field frequency is 100 Hz by a processing such as an interpolation or the like.

The field frequency doubler circuit 26 includes an input terminal 261 connected to a TV receiver, frequency doubler circuit 262 and a frame memory 263 as shown in FIG. 11.

The frequency doubler circuit 262 is supplied with telecine-converted image signal from the TV receiver via the input terminal 261 and writes the signal into the frame memory 263. The frequency doubler circuit 262 reads the image signal once written to the frame memory 263 at a speed double that at which the signal has been written. Thus, the frequency of image signal of a film image of 50 fields/sec in the PAL system is doubled. That is, image signal of 100 fields/sec can be reproduced. The frequency doubler circuit 262 sends the double-frequency image signal to the motion correction system 20.

FIGS. 12A and 12B show the relation between each field before and after subjected to frequency doubling in the field frequency doubling circuit 26 and the pixel position. In FIGS. 12A and 12B, the horizontal axis indicates a time, while the vertical axis indicates a vertical position of a pixel.

The image signal before being frequency-doubled is interlaced image signal of 50 fields/sec in the PAL and forms one frame from two fields thereof as shown in FIG. 12A.

On the other hand, the image signal after frequency-doubled is interlaced image signal of 100 fields/sec and thus yields two new fields t2' and t1' between fields t1 and t2 as shown in FIG. 12B. Two new fields t4' and t3' are formed between fields t3 and t4 without yielding no field between the fields t2 and t3. Say, the image signal will form one frame from four fields.

Each of the newly formed fields t1', t2', . . . may have its own pixel value determined as a mean value, respectively, of three pixels surrounding that pixel by a median filter or the like in some cases. The newly formed fields t1', t2', . . . will have the same contents as the fields t1, t2, . . . , respectively. Thus, the four fields will form one frame. By increasing the number of images per unit time, the resolution can be improved and screen flicker can be prevented.

Figures 13A, 13B:
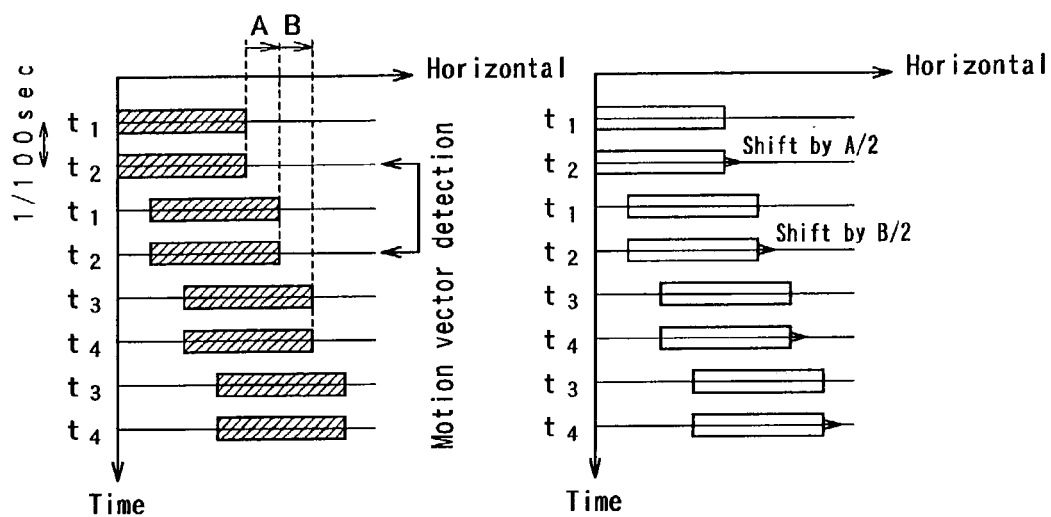
FIGS. 13A and 13B show the relation between each field and image position when a frequency-doubled image is shifted horizontally.

FIG. 13A shows the relation between each field and pixel position when image signal in which one frequency-doubled frame is formed from four fields is shifted horizontally by the motion correction system 20. In FIG. 13A, the horizontal axis indicates a horizontal position of an image, while the vertical axis indicates a time. An image whose field frequency has already been double is supplied in the sequence of fields t1, t2', t1' and t2 to the image memory 21 at constant time intervals. The fields t1 and t2' have pixels in the same position, and also the fields t1' and t2 have pixels in the same position.

The motion vector detector 1 determines a motion vector between these fields (frames) as above. As shown in FIG. 13B for example, when the quantity of a motion vector determined between the fields t1 and t1' is A, the image shifter 22 will shift the field t2' in an intermediate position between the fields t1 and t1' by A/2. Also, when the quantity of a determined motion vector between the subsequent fields is B, the image shifter 22 will also shift the intermediate field by B/2.

Figure 14:
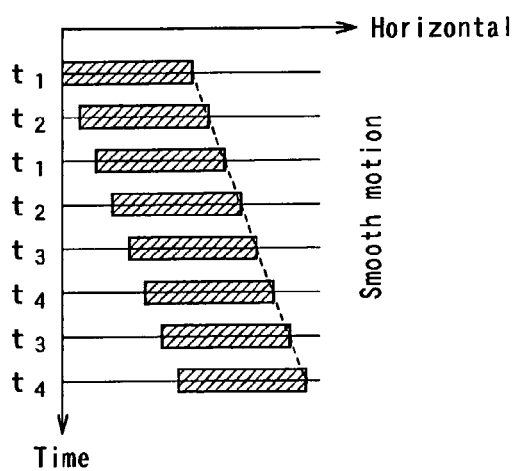
FIG. 14 shows the result of motion correction of an image converted to move at a double speed.

Repeating the above operations, an image whose frequency-doubled frame is composed of four fields as shown in FIG. 14 can shown a smoother motion.

When a motion vector determined with the block matching technique is outside a search range, the motion vector detector 1 according to the present invention can correct the motion vector so that it will match a real image motion. So, by doubling the field frequency of image signal, it is possible to move an image more smoothly, reduce the image degradation. These effects in combination will assure the user of quality images.

Also, the present invention is not limited to the embodiment having been illustrated and explained in the foregoing but can of course be applied to a signal converter or the like which is used in connection with a TV receiver, for example.

Also the motion vector detector according to the present invention cannot only be implemented as a circuit, hardware or the like but also as a software in a processor.

Further, the motion vector detector according to the present invention can be applied to interpolation of input image signal in the aforementioned interlacing as well as to the inter-frame encoding by a motion compensation prediction in MPEG (moving pictures experts group) for example.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, when a motion vector, determined with the block matching technique between a reference block taking a reference pixel extracted from a current frame as its origin and a search block extracted from a reference frame and moving within or along the circumference of a search range, is outside the search range, the motion vector detector and a motion vector detecting method according to the present invention corrects the quantity of the motion vector so that it will fall within the search range.

Therefore, even when the motion vector determined with the block matching technique exists outside the search range, the motion vector detector and a motion vector detecting method according to the present invention can correct the motion vector so that it will match a real image motion. So, the motion vector detector and a motion vector detecting method according to the present invention can prevent any image quality degradation and failure in processing of each area.

What is claimed is:

1. A motion vector detector for detecting a motion vector of a reference pixel in a current input frame with a block matching technique, the detector comprising:
   a vector calculating means for sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;
   a vector correcting means for correcting a vector quantity of the motion vector determined by the vector calculating means so that the vector quantity falls within the search range in case that the pixel position for the smallest difference absolute-value sum exists outside the search range; and
   an image feature extracting means for extracting a feature or features of an image in the current frame;

wherein the vector correcting means makes a correction according to the image extracted by the image feature extracting means.

2. The detector as set forth in claim 1, wherein the vector correcting means matches at least one of a plurality of horizontal/vertical components of a motion vector under correction with the corresponding component of the motion vector determined by the vector calculating means.

3. The detector as set forth in claim 1, wherein the vector correcting means presets a plurality of possible motion vectors whose quantity will fall within the search range and selects, as a motion vector to be corrected, one of the plurality of possible motion vectors according to a pixel position where the difference absolute-value sum is smallest.

4. The detector as set forth in claim 3, wherein the vector correcting means presets a plurality of possible motion vectors whose direction is horizontal or vertical.

5. The detector as set forth in claim 1, wherein the vector correcting means matches the direction of a motion vector under correction with that of a motion vector determined by the vector calculating means.

6. A motion vector detector for detecting a motion vector of a reference pixel in a current input frame with a block matching technique, the detector comprising:
   a vector calculating means for sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;
   a vector correcting means for correcting a vector quantity of the motion vector determined by the vector calculating means so that the vector quantity falls within the search range in case that the pixel position for the smallest difference absolute-value sum exists outside the search range; and
   an identifying means for identifying a distribution tendency of difference absolute-value sums in case that the pixel position where the difference absolute-value sum is smallest is within the search range;
   wherein the vector correcting means makes a correction according to the distribution tendency of the difference absolute-value sums, identified by the identifying means.

7. A motion vector detector for detecting a motion vector of a reference pixel in a current input frame with a block matching technique, the detector comprising:
   a vector calculating means for sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;
   a vector correcting means for correcting a vector quantity of the motion vector determined by the vector calculating means so that the vector quantity falls within the search range in case that the pixel position for the smallest difference absolute-value sum exists outside the search range; and
   a polarity identifying means for identifying a polarity of a horizontal component of a motion vector of one of a plurality of pixels in a horizontal line, which is one pixel above the reference pixel in the current frame, that has been corrected by the vector correcting means;
   wherein the vector correcting means makes a correction on the basis of a tendency of the polarity identified by the polarity identifying means.

8. A motion vector detector for detecting a motion vector of a reference pixel in a current input frame with a block matching technique, the detector comprising:
   a vector calculating means for sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel; and
   a vector correcting means for correcting a vector quantity of the motion vector determined by the vector calculating means so that the vector quantity falls within the search range in case that the pixel position for the smallest difference absolute-value sum exists outside the search range;
   wherein an input image signal including the current frame and the reference frame is an interlaced image signal whose field frequency in a PAL has been converted from 50 Hz to 100 Hz.

9. A motion vector detector for detecting a motion vector of a reference pixel in a current input frame with a block matching technique, the detector comprising:
   a vector calculating means for sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;
   a vector correcting means for correcting a vector quantity of the motion vector determined by the vector calculating means so that the vector quantity falls within the search range in case that the pixel position for the smallest difference absolute-value sum exists outside the search range; and
   a shift magnitude calculating means for calculating a magnitude, by which the reference pixel is to be shifted, for each of a plurality of fields forming each frame according to the motion vector determined by the vector calculating means or the motion vector having been corrected by the vector correcting means.

10. A motion vector detecting method of detecting a motion vector of a reference pixel in a current input frame with a block matching technique, the method comprising steps of:
    sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;

correcting a vector quantity of the motion vector determined in the sequentially calculating step so that the vector quantity falls within the search range in case that the pixel position for the smallest difference absolute-value sum exists outside the search range; and extracting a feature or features of an image in the current frame;

wherein the correcting step makes a correction according to the extracted image.

11. The method as set forth in claim 10, wherein at least one of a plurality of horizontal/vertical components of a motion vector under correction are made to match a corresponding component of the motion vector determined by the sequentially calculating step.

12. The method as set forth in claim 10, wherein a plurality of possible motion vectors whose quantity will fall within the search range is preset and one of the plurality of possible motion vectors according to a pixel position where the difference absolute-value sum is smallest is selected as a motion vector to be corrected.

13. The method as set forth in claim 12, wherein a plurality of possible motion vectors whose direction is horizontal or vertical is preset.

14. The method as set forth in claim 10, wherein the direction of a motion vector under correction is made to match that of a motion vector determined by the vector calculating means.

15. A motion vector detecting method of detecting a motion vector of a reference pixel in a current input frame with a block matching technique, the method comprising Steps of:

sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;

correcting a vector quantity of the motion vector determined in the sequentially calculating step so that the vector quantity falls within the search range in case that the pixel position for the smallest difference absolute-value sum exists outside the search range; and identifying a distribution tendency of difference absolute-value sums in case that the pixel position where the difference absolute-value sum is smallest is within the search range;

wherein the correcting step makes a correction according to the identified distribution tendency of the difference absolute-value sums.

16. A motion vector detecting method of detecting a motion vector of a reference pixel in a current input frame with a block matching technique, the method comprising steps of:

sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;

correcting a vector quantity of the motion vector determined in the sequentially calculating step so that the vector quantity falls within the search range in case that the pixel position for the smallest difference absolute-value sum exists outside the search range; and identifying a polarity of a horizontal component of a motion vector of one of a plurality of pixels in a horizontal line, which is one pixel above the reference pixel in the current frame, that has been corrected by the correcting step;

wherein the correcting step makes a correction on the basis of a tendency of the identified polarity.

17. A motion vector detecting method of detecting a motion vector of a reference pixel in a current input frame with a block matching technique, the method comprising steps of:

sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel; and correcting a vector quantity of the motion vector determined in the sequentially calculating step so that the vector quantity falls within the search range in case that the pixel position for the smallest difference absolute-value sum exists outside the search range;

wherein an input image signal including the current frame and the reference frame is an interlaced image signal whose field frequency in a PAL has been converted from 50 Hz to 100 Hz.

18. A motion vector detecting method of detecting a motion vector of a reference pixel in a current input frame with a block matching technique, the method comprising steps of:

sequentially calculating a sum of absolute values of differences in pixel between a reference block taking as its origin a reference pixel extracted from a current frame and a search block moving within or along a circumference of a search range extracted from a reference frame, which is one frame after the current frame, to determine the motion vector between a pixel position within the search block in which the difference absolute-value sum is smallest and a position of the reference pixel;

correcting a vector quantity of the motion vector determined in the sequentially calculating step so that the vector quantity falls within the search range in case that the pixel position for the smallest difference absolute-value sum exists outside the search range; and calculating a magnitude, by which the reference pixel is to be shifted for each of a plurality of fields forming each frame according to a determined motion vector or a corrected motion vector.

* * * * *